Nov. 12, 1968  L. D. LAKE  3,411,020
POWER TURN-OFF TIMER
Filed Oct. 11, 1965  2 Sheets-Sheet 1

INVENTOR.
LELYN D. LAKE
BY *Robert Geurne*
ATTORNEY

INVENTOR.
LELYN D. LAKE
ATTORNEY

United States Patent Office 3,411,020
Patented Nov. 12, 1968

3,411,020
POWER TURN-OFF TIMER
Lelyn D. Lake, Carmel, Ind., assignor to P. R. Mallory & Co. Inc., Indianapolis, Ind., a corporation of Delaware
Filed Oct. 11, 1965, Ser. No. 494,485
14 Claims. (Cl. 307—252)

ABSTRACT OF THE DISCLOSURE

A power turn-off timer which includes an astable multivibrator having an output signal which is altered by rectifier means coupled thereto. The altered output signal of the multivibrator is the input signal to an RC circuit which cooperates with a four-layer diode to force commutate a controlled rectifier. The commutation of the controlled rectifier substantially prevents further flow of current to a load.

---

The present invention relates to means and methods for terminating the flow of electrical power supplied from a source of electrical power to an electromechanical device such as a power relay, electric motor or the like.

Various electrical and electronic applications often require an accurate time duration during which electrical power flows from a source of electrical power to a load that utilizes the electrical power to perform a predetermined function that may be performed in an elapsed time of about 30 seconds. Upon the performance of the desired function, it is necessary to accurately terminate the flow of electrical current to the load in order to substantially prevent unnecessary waste of current supplied by the source of electrical power and to prolong the useful life of the components of the electrical circuitry.

Although numerous electronic circuits have been devised and employed in the past under the introductory title of timing circuit, considerable difficulty has been experienced in providing a timing circuit capable of terminating the flow of current to a load requiring several amperes to actuate it with facility and certainty in the accuracy of results without the use of bulky components.

The utilization of a silicon controlled rectifier permits the timing circuit to control the flow of a current in excess of several amperes. However, the use of a silicon controlled rectifier has drawbacks in that the gate thereof has no control over the silicon controlled rectifier once the anode to cathode current is flowing. External methods have been utilized to stop the flow of current through the silicon controlled rectifier. Generally, commutation, as the turn-off process of the silicon controlled rectifier is called, is usually accomplished by opening a switch. It should be noted that the switch must be operated before the turn-off of the timing circuit is realized and that the operation of the switch will cause the silicon controlled rectifier to endure high surge voltages that may alter the electrical characteristics of the controlled rectifier. The present invention utilizes an RC circuit and a four-layer diode to force commutate the controlled rectifier.

Therefore, it is an object of the present invention to provide a power turn-off timer which utilizes force commutation of a silicon controlled rectifier.

Another object of the present invention is to provide a power turn-off timer which utilizes the unique characteristics of a silicon controlled rectifier to control the flow of current of several amperes to a load.

Yet another object of the present invention is to provide a power turn-off timer which is compact, relatively simple in design and highly accurate in terminating the flow of current to a load after a predetermined interval of time.

Still another object of the present invention is to provide a power turn-off timer for controlling relatively heavy direct current loads which may be actuated by the closure of a switch and deactuated automatically at the end of a predetermined interval of time.

A further object of the present invention is to provide a power turn-off timer which will terminate the flow of electrical current to a load after an elapse time of about thirty seconds.

Yet another object of the present invention is to provide a power turn-off timer that utilizes a silicon controlled rectifier switch that is commutated by an RC timing circuit discharging through a gate circuit.

Another object of the present invention is to provide a power turn-off timer having optimum reliability characteristics afforded by a construction having a minimum number of components.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

Generally speaking, the means and method of the present invention relate to force commutation of a power turn-off timer circuit. An input circuit is coupled to a source of direct current. A semiconductor switch means is coupled to the input circuit and is biased to conduction by the flow of current through the input circuit. A load means is coupled to the semiconductor switch such that the load means is actuated by the flow of a current from the source of direct current through the semiconductor switch means. An astable multivibrator means is coupled to the semiconductor switch means such that the flow of current through the semiconductor switch means causes the astable multivibrator to provide a pulsating output. A timing means is coupled to the output of the astable multivibrator. The timing means attains a predetermined charge after an elapse of a predetermined interval of time. A gate means is coupled between the timing means and the semiconductor switch means. The gate means is biased to conduction when the timing means attains a predetermined charge. Thereafter, the timing means discharges through the conducting gate means so as to bias the semiconductor switch means to nonconduction thereby terminating the flow of current from the direct current source to the load means.

Figure 1:
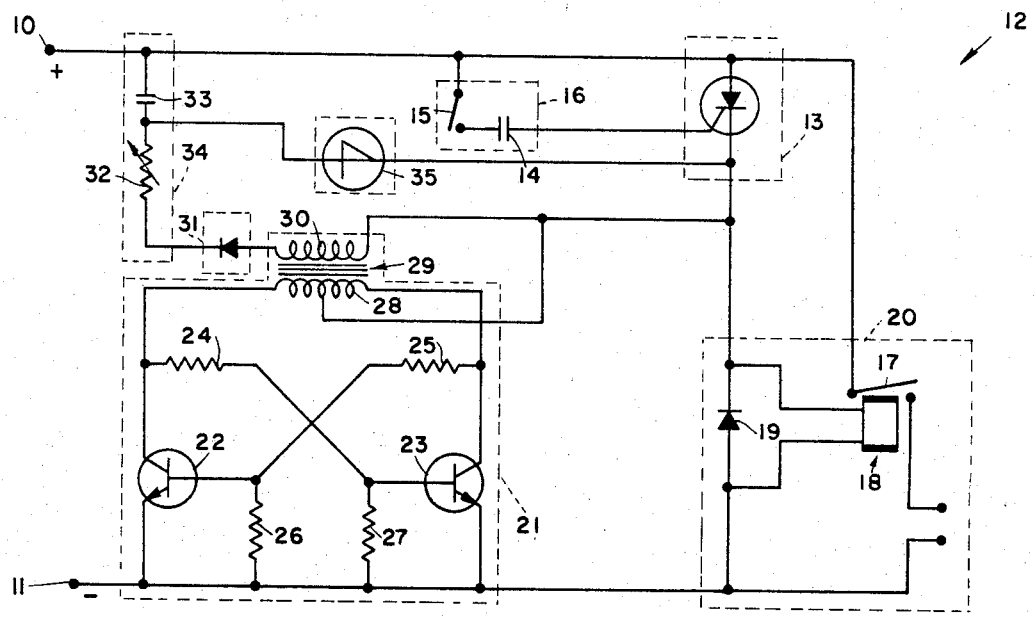
FIGURE 1 is an electrical schematic of a power turn-off timer illustrating the utilization of a relay to handle load currents.

Referring now to FIGURE 1 of the drawings, terminal 10 of the power turn-off timer 12 is coupled to the positive side of a suitable direct current source (not shown). Terminal 11 of the power turn-off timer is coupled to the negative side of the direct current source. A semiconductor switch means 13 such as silicon controlled rectifier has its anode coupled to terminal 10. The gate of the controlled rectifier is coupled to terminal 10 through a series coupled capacitor 14 and two position mechanical switch 15. The serially connected mechanical switch and capacitor form an input circuit 16 that is used to bias the silicon controlled rectifier to conduction when mechanical switch 15 is closed.

The anode of the semiconductor switch is also coupled to the displaceable reed 17 of relay means 18. The output of the relay is coupled to any suitable means to be actuated by the closing of the relay such as an electromechanical device (not shown). One side of the coil of the relay is coupled to the cathode of the semiconductor switch. The other side of the coil of the relay is coupled to the negative terminal 11. Coupled across the coil of the relay is a diode 19. Diode 19 bypasses the reverse inductive surge when the relay is deenergized. The cathode of the diode is coupled to the cathode of the silicon controlled rectifier as illustrated in FIGURE 1. The electromechanical device (not shown), the diode and the relay grouped together constitute the load 20 of the power turn-off timer 12.

Coupled between the cathode of the controlled rectifier and the negative terminal 11 is an astable multivibrator 21. The astable multivibrator is the so-called "free running" multivibrator. The multivibrator is comprised of NPN transistors 22 and 23, the emitters of which are coupled to the negative terminal 11. Resistors 24 and 25, respectively, couple each transistor collector to the base of the other transistor. The base of each transistor is respectively connected through resistors 26 and 27 to the negative terminal 11. A primary winding 28 of transformer 29 is connected between the transistor collectors. The transistors function in the multivibrator circuit as switching devices which are alternatively conductive and non-conductive. The emitter and the collector act as switching terminals for the circuit, while the base acts as a control terminal for controlling conduction and nonconduction of the transistor.

Assuming free running operation of the astable multivibrator and assuming that transistor 22 is conducting, the potential at the collector will approach that at the emitter. The internal resistance of a transistor is characteristically low during conduction. The other transistor 23 is retained at a non-conducting state by the potential fed to its base from the collector of transistor 22 through resistor 24 since this potential is somewhat less in value than the voltage on the emitter of transistor 22, as determined by the voltage divider composed of the resistors 24 and 27 to ground. The emitters of the transistor have a predetermined bias voltage impressed thereon which tends to stabilize the frequency of operation of the multivibrator. The center tap of the primary winding causes voltage initially to flow from the direct current source through the center tap of the primary winding to the transistor 22. Due to the transformer action of the transformer, voltage flows in the other half of the primary winding. The increasing voltage in the other half of the transformer is due to the transformer action of the transformer 29. This voltage will be reflected as a cut off bias at the base of the transistor 22. The transistor 22 consequently will be biased to cut off, and the voltage on the collector of the transistor 22 will rise in value. This voltage rise will be reflected through resistor 24 to the base of the transistor 23 and cause it to initiate conduction. The aforementioned brief description completes one half cycle of operation. By transformer action of the transformer, the astable multivibrator again reverses conduction. The output of the astable multivibrator is taken across the secondary winding 30 of the transformer 29.

A pulsating wave appears across the secondary winding of the transformer. As disclosed hereinbefore and as shown in FIGURE 1, one side of the secondary winding of the transformer is coupled to the center tap of the primary winding of the transformer and to the cathode of the silicon controlled rectifier or semiconductor switch 13. The other side of the secondary winding is coupled to the anode of one-half wave rectifier 31. The cathode of the one-half wave rectifier is coupled in series to a resistance 32.

The resistor 32 has its other side coupled to a capacitor 33. As illustrated in FIGURE 1, the capacitor 33 is connected between the resistor 32 and terminal 10. The combination of the resistor 32 and the capacitor 33 form an RC timing circuit 34. The combination of resistance and capacitance is widely used in time delay circuits, the rate or time of charging of the capacitor through the resistor being a function of the product of the resistance and capacitance, called the RC constant. The RC or time constant of this circuit may be varied by changing the value of the resistance or the capacitance, or both. It is seen that the flow of current from the secondary winding of the coil to the timing circuit causes the capacitor to store energy. The time interval required to charge the capacitor to a predetermined value is determined in part by the RC time constant of the timing circuit.

The output of the timing circuit is fed to the anode of a diode or gate means 35. The diode is a four-layer transistor diode, and comprises a three junction semiconductor which conducts current when the potential applied thereacross reaches a threshold value. The voltage characteristics of the gate means 35 are such that upon firing the voltage across the diode drops from a relatively high value to a relatively low value. The predetermined voltage to which the capacitor of the timing circuit is charged substantially corresponds to the potential at which the four-layer diode or gate means fires. When the gate means fires, the capacitor of the timing circuit discharges therethrough. As shown by FIGURE 1, the cathode of the gate means is coupled to the cathode of the silicon controlled rectifier or switch means 13. The flow of current to the cathode of the switch means 13 is sufficient to bias the switch means to non-conduction. With the cessation of current flow from the direct current source to the winding of the relay means 18, the relay reed 18 assumes its normally open position thereby terminating the flow of current through the load 20.

With the hereinbefore structural disclosure in mind and by continued reference to FIGURE 1 of the drawings, the following analysis of the operation of the invention shown in FIGURE 1 will further serve to amplify the novelty of the present invention.

Actuation of the input circuit by manual or automatic means causes a bias current to flow to the gate of the semiconductor switch. The bias current causes the semiconductor switch to be biased to conduction. Then current flows from the direct current source through the semiconductor switch to a load causing actuation of the load. Current also flows from the direct current source to an astable multivibrator which produces a plurality of pulses at a predetermined frequency. The plurality of pulses are rectified by a one-half wave rectifier and fed to an RC timing circuit. When the capacitor attains a predetermined charge level, as determined by the time constant of the timing circuit, a gate means connected to the timing circuit is biased to conduction when the capacitor reaches its predetermined charge level. When the gate is biased to conduction, the capacitor of the timing circuit discharges therethrough thereby biasing the semiconductor switch to nonconduction. Biasing the semiconductor switch to non-conduction disconnects the load from the direct current source thereby deenergizing the load.

Figure 2:
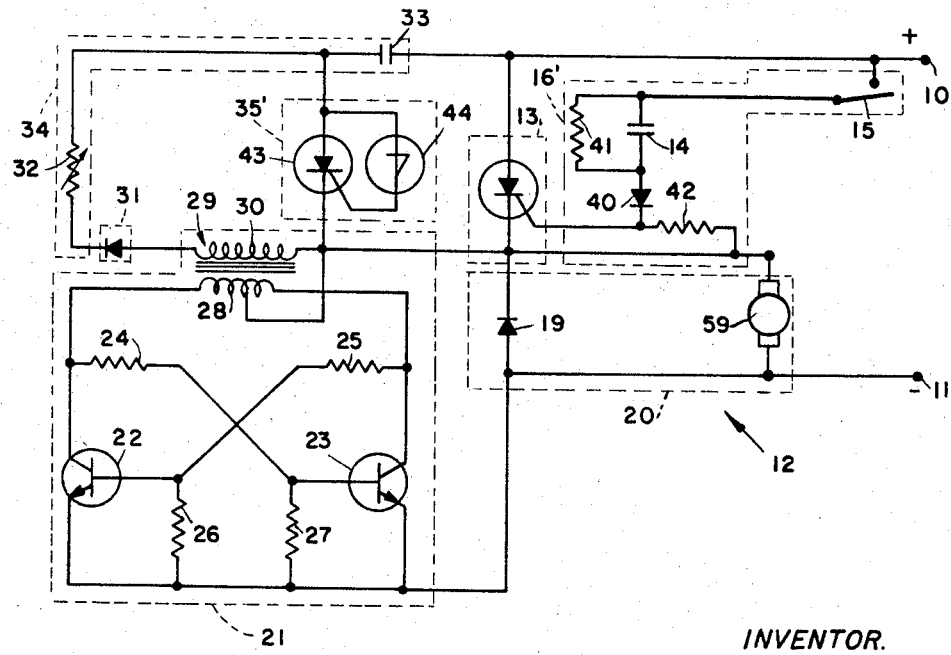
FIGURE 2 is an electrical schematic of a power turn-off timer illustrating the utilization of a silicon controlled rectifier to handle load currents.

The electrical schematic of FIGURE 2 is similar to that of FIGURE 1 except for modifications incorporated into the input circuit 16' and the gate means 35'. The input circuit 16' includes capacitor 14 coupled to the gate of the switch means 13 through a diode 40. Coupled in parallel combination with the capacitor 14 is a resistor 41. A resistor 42 is coupled between the gate and the cathode of the switch means.

The input circuit 16' allows accurate control of the time duration between the closing of the mechanical switch 15 and the turn-on of the switch means 13. The accurate control of the turn-on timer of the switch means allows the power turn-off timer to initiate its timing cycle at substantially the same elapsed time after each closure of the mechanical switch means thereby resulting in substantially the same time duration upon each closure of the mechanical switch.

The gate means 35' of the embodiment of FIGURE 2 includes a silicon controlled rectifier 43 coupled in the gate circuit. The four-layer diode 44 has its anode coupled to the anode of the silicon controlled rectifier. The cathode of the four-layer diode is to the gate of the silicon controlled rectifier 43. The cathode of the silicon controlled rectifier 43 is coupled to the cathode of the switch means 13.

The gate means 35' is utilized when the turn-off current for the switch means 13 is greater than the pulse current rating of the four-layer diode 44 of the gate means 35 of FIGURE 1. The operation of the circuit illustrated in FIGURE 2 is substantially the same as the operation of the circuit illustrated in FIGURE 1.

Figure 3:
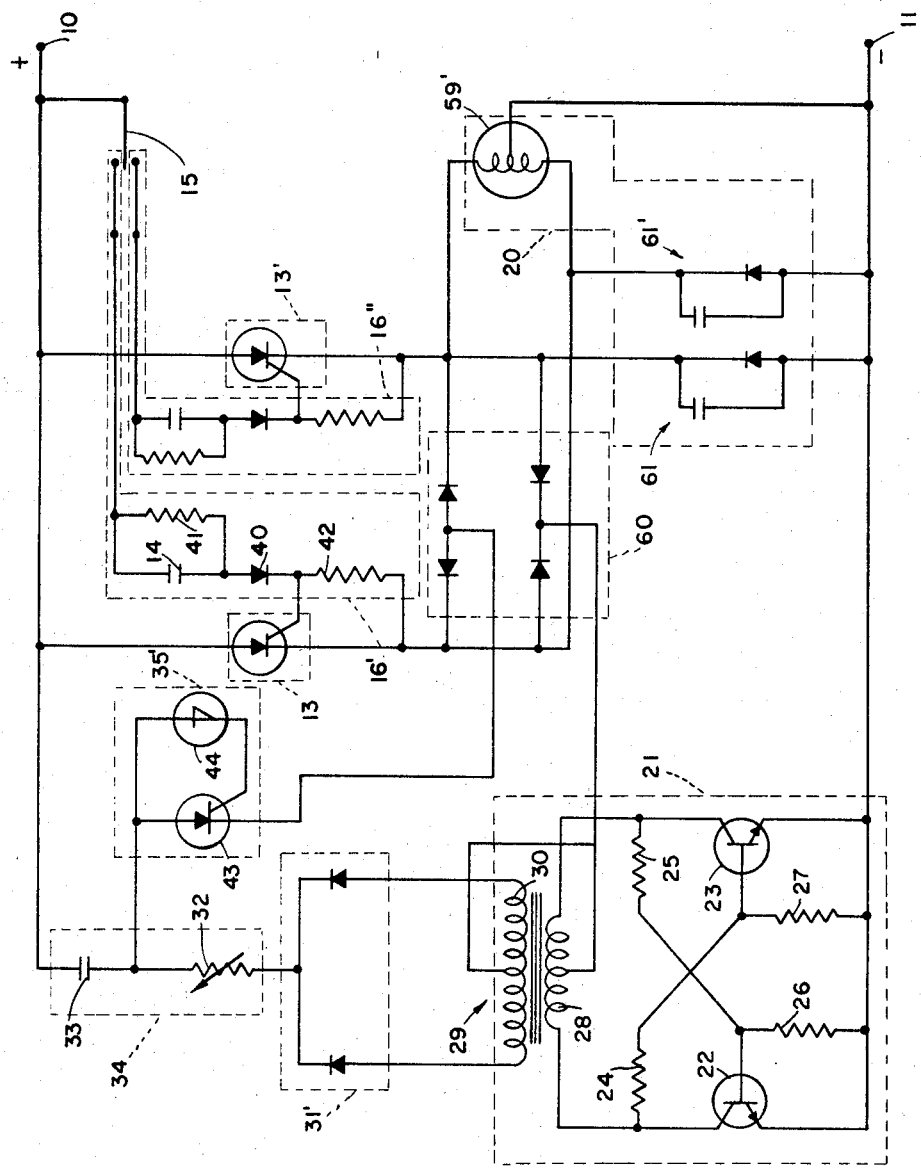
FIGURE 3 is an electrical schematic of a power turn-off timer controlling the direction of current flow to a load.

The embodiment of the power turn-off timer illustrated in FIGURE 3 is similar to the embodiment of the power turn-off timer shown in FIGURE 2 except that a three position mechanical switch 15' is utilized to switch between input circuit 16' and input circuit 16". As illustrated in FIGURE 3, input circuits 16' and 16" are mirror images of each other and function in the manner described in conjunction with the input circuit 16' of the power turn-off timer of FIGURE 2. It is seen from FIGURE 3 that either input circuit 16' or input circuit 16" is energized by the closure of the mechanical switch. Both of the input circuits cannot be energized at substantially the same instant of time by the direct current source (not shown) since no provision is made therefor. If input circuit 16' is actuated by the closure of switch 15', the current flow is in a first direction to the load. If input circuit 16" is actuated by closure of switch 15', the current flow to the load is in a direction opposite to that of current flow when input circuit 16' is actuated. If the load is a motor 59' as illustrated in FIGURE 3, the shaft of the motor will rotate in the clockwise direction or the counterclockwise direction as determined by the direction of the flow of the current into the load. The parallel connected resistor and diode combinations 61 and 61' protect the motor 59' from inductive surges.

Another modification of FIGURE 3 over FIGURE 2 is the use of a full-wave rectifier 31 in lieu of a one-half wave rectifier. The use of the full wave rectifier permits full utilization of the pulses produced by the astable multivibrator 21. Full utilization of the pulses produced by the multivibrator charges the capacitor at about twice the charging rate as when only one-half the pulses produced by the multivibrator are used to charge the capacitor.

A steering means 60 is coupled in the circuit as illustrated in FIGURE 3 for the purpose of maintaining isolation between the two load circuits and the two switch means 13.

While the invention is illustrated and described in embodiments, it will be understood that modifications and variations may be effected without departing from the scope of the novel concepts of this invention and as set forth in the appended claims.

Having thus described my invention, I claim:

1. A power turn-off timer circuit comprising: an input circuit coupled to a source of direct current; semiconductor switch means coupled to said input circuit, said switch means biased to conduction by the flow of current through said input circuit; a load coupled to said switch means, said load actuated by the flow of current from said source of direct current through said switch means; an astable multivibrator coupled to said switch means, the flow of current through said switch means causing said multivibrator to provide a pulsating output; a rectifier means coupled to said output of said multivibrator, said rectifier means for altering said pulsating wave; timing means coupled to said rectifier means including capacitance means attaining a predetermined charge after an elapse of a predetermined interval of time; and gate means coupled between said timing means and said switch means, said gate means biased to conduction when said capacitance of said timing means attains said predetermined charge, said capacitance of said timing means discharging through said conducting gate means so as to bias said switch means to non-conduction thereby terminating the flow of current from said source to said load means.

2. The power turn-off timer of claim 1, wherein said gate means includes a four-layer diode.

3. The power turn-off timer of claim 1, wherein said timing means further includes resistance means to thereby provide a resistance-capacitance timing circuit.

4. A power turn-off timer circuit comprising: an input circuit coupled to a source of direct current; silicon controlled rectifier switch means coupled to said input circuit, said switch means biased to conduction by the flow of current through said input circuit; a load coupled to said switch means, said load actuated by the flow of current from said source of direct current through said switch means; an astable multivibrator coupled to said switch means, the flow of current through said switch means causing said multivibrator to provide a pulsating output; rectifier means coupled to said output of said multivibrator, said rectifier means for altering said pulsating wave; timing means coupled to said rectifier means including capacitance means attaining a predetermined charge after an elapse of a predetermined interval of time; and gate means including a four-layer diode coupled between said timing means and said switch means; said gate means biased to conduction when said capacitance of said timing means attains said predetermined charge, said capacitance of said timing means discharging through said conducting gate means so as to bias said switch means to non-conduction thereby terminating the flow of current from said source to said load means.

5. The power turn-off timer of claim 4, wherein said timing means includes resistance means coupled between said gate means and said multivibrator and said capacitance means coupled between said direct current source and said gate means.

6. The power turn-off timer of claim 4, wherein said rectifier means includes diode means for altering said pulsating wave so that about one-half of said wave charges said capacitor.

7. A power turn-off timer circuit as defined in claim 4 wherein said silicon controlled rectifier switch means includes a gate coupled to said input circuit, an anode coupled to said direct current source, and a cathode coupled to said load means.

8. A power turn-off timer circuit as defined in claim 4 wherein said four-layer gate means includes an anode coupled to said timing means and a cathode coupled to said switch means.

9. A power turn-off timer circuit as defined in claim 4 wherein said input circuit includes a parallel combination of a resistor and a capacitor, one side of said parallel combination coupled to said direct current source, the other side of said parallel combination coupled to an anode of a diode, the cathode of said diode coupled to said switch means and said load means.

10. A power turn-off timer circuit comprising: an input circuit coupled to a source of direct current; a silicon controlled rectifier switch means coupled to said input circuit, said switch means biased to conduction by the flow of current through said input circuit; a load means coupled to said switch means, said load means actuated by the flow of current from said source of direct current through said switch means; an astable multivibrator coupled to said switch means, the flow of current through said switch means causing said multivibrator to provide a pulsating output; a rectifier means coupled to said output of said multivibrator, said rectifier means for altering said pulsating wave; a resistance and capacitance timing means coupled to said rectifier means, said capacitance of said timing means attaining a predetermined charge after an elapse of a predetermined interval of time; and a gate means, said gate means including a four-layer diode coupled between said timing means and said switch means, said gate means biased to conduction when said capacitance of said timing means attains said predetermined charge, said capacitance of said timing means discharging through said conducting gate means so as to bias said switch means to non-conduction thereby terminating the flow of current from said source to said load means.

11. A power turn-off timer circuit as defined in claim 10 wherein said rectifier means is a one-half wave rectifier means.

12. A power turn-off timer circuit as defined in claim 10 wherein said rectifier means is a full-wave rectifier means.

13. A power turn-off timer circuit as defined in claim 10 wherein said gate means also includes a silicon controlled rectifier having an anode coupled to said timing means, a cathode coupled to said switch means, and a gate terminal, said four-layer diode coupled between said anode and said gate terminal of said silicon controlled rectifier.

14. A power turn-off timer circuit comprising: a plurality of input circuits coupled to a source of direct current, said input circuits including means for energizing only a single input circuit; a silicon controlled rectifier switch means coupled to each of said input circuits, one of said switch means biased to conduction by the flow of current through a cooperatively associated input circuit; a load means coupled to said switch means, said load means actuated by the flow of current from said source of direct current through said switch means, the direction of said flow of current through said load dependent on which of said plurality of input circuits is actuated; an astable multivibrator coupled to said switch means, the flow of current through said switch means causing said multivibrator to provide a pulsating output; a rectifier means coupled to said output of said multivibrator, said rectifier means for altering said pulsating wave; a resistance and capacitance timing means coupled to said rectifier means, said capacitance of said timing means attaining a predetermined charge after an elapse of a predetermined interval of time; and a gate means including a silicon controlled rectifier and a four-layer diode coupled in parallel, said gate means coupled between said timing means and said switch means, said gate means biased to conduction when said capacitance of said timing means attains said predetermined charge, said capacitance of said timing means discharging through said conducting gate means so as to bias said switch means to non-conduction thereby terminating the flow of current from said source to said load means.

References Cited

UNITED STATES PATENTS 3,144,591    8/1964    Levinson _____ __307—88.5 X
3,158,757    11/1964    Rywak _____ 307—88.5

ARTHUR GAUSS, *Primary Examiner.*

B. P. DAVIS, *Assistant Examiner.*